US010590552B2

United States Patent
Harano et al.

(10) Patent No.: US 10,590,552 B2
(45) Date of Patent: Mar. 17, 2020

(54) HYDROGEN PRODUCTION APPARATUS AND HYDROGEN PRODUCTION SYSTEM

(71) Applicant: Kabushiki Kaisha Toshiba, Minato-ku (JP)

(72) Inventors: Tomomi Harano, Sagamihara (JP); Masatoshi Higuchi, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 175 days.

(21) Appl. No.: 15/922,094

(22) Filed: Mar. 15, 2018

(65) Prior Publication Data

US 2018/0202053 A1    Jul. 19, 2018

Related U.S. Application Data

(63) Continuation of application No. PCT/JP2015/077875, filed on Sep. 30, 2015.

(51) Int. Cl.
C25B 15/02 (2006.01)
C25B 15/08 (2006.01)
(Continued)

(52) U.S. Cl.
CPC ............... *C25B 15/02* (2013.01); *C25B 1/04* (2013.01); *C25B 1/10* (2013.01); *C25B 15/08* (2013.01);
(Continued)

(58) Field of Classification Search
CPC ........... C25B 15/02; C25B 15/08; C25B 1/04; C25B 1/10
See application file for complete search history.

(56) References Cited

U.S. PATENT DOCUMENTS 4,263,112 A       4/1981  Aylward
2003/0141200 A1*  7/2003  Harada ............... C25B 1/12
                                                205/637

(Continued)

FOREIGN PATENT DOCUMENTS

JP       8-144079 A       6/1996
JP    2010-532823 A      10/2010
(Continued)

OTHER PUBLICATIONS

Isao Abe, "Hydrogen Production by Water Electrolysis", Hydrogen Energy System, vol. 33, No. 1, 2008, pp. 19-26 (with English Abstract).

(Continued)

*Primary Examiner* — Nicholas A Smith
(74) *Attorney, Agent, or Firm* — Oblon, McClelland, Maier & Neustadt, L.L.P.

(57) ABSTRACT

The hydrogen production apparatus includes: a rectifier supplied with first electrical power from outside, and that outputs direct-current second electrical power; an electrolyzer supplied with the second electrical power and that carries out electrolysis of an alkaline aqueous solution; a pure water tank that retains a pure water; a pure water pipe connected between the pure water tank and an electrolyzer, allowing the pure water to be distributed from the pure water tank to the electrolyzer; an inert gas cylinder that contains an inert gas; and a first valve connected between the inert gas cylinder and the pure water pipe, is the first valve being closed when the first electrical power is supplied, and being open when the first electrical power is not supplied. The inert gas is introduced into the pure water pipe by opening the first valve.

14 Claims, 5 Drawing Sheets

(51) Int. Cl.
*C25B 1/10* (2006.01)
*C25B 1/04* (2006.01)
*G08B 17/10* (2006.01)
*H01M 8/0656* (2016.01)
*H01M 16/00* (2006.01)
*H02M 7/28* (2006.01)

(52) U.S. Cl.
CPC .......... *G08B 17/10* (2013.01); *H01M 8/0656* (2013.01); *H01M 16/003* (2013.01); *H02M 7/28* (2013.01); *Y02E 60/366* (2013.01); *Y02P 20/133* (2015.11)

(56) References Cited

U.S. PATENT DOCUMENTS

| | | |
|---|---|---|
| 2010/0264038 A1 | 10/2010 | Duret |
| 2013/0175161 A1 | 7/2013 | Morelle et al. |
| 2013/0180609 A1 | 7/2013 | Fobelets et al. |
| 2016/0312371 A1 | 10/2016 | Kamei et al. |
| 2018/0202053 A1 | 7/2018 | Harano et al. |

FOREIGN PATENT DOCUMENTS

| | | |
|---|---|---|
| JP | 2013-537260 A | 9/2013 |
| JP | 2015-117407 | 6/2015 |
| JP | 6165972 B1 | 7/2017 |

OTHER PUBLICATIONS

Hisao Watanabe, et al., "Hydrogen Electric Power Storage System Using Renewable Electricity", Toshiba Review, vol. 68, No. 7, 2013, pp. 35-38 (with English Abstract).
Patent Application Technology Trend Survey Report, Japan Patent Office, 2014, 4 pages (with English language translation).
International Search Report dated Nov. 10, 2015 in PCT/JP2015/077875, filed on Sep. 30, 2015 (with English Translation).
Written Opinion dated Nov. 10, 2015 in PCT/JP2015/077875, filed on Sep. 30, 2015.

* cited by examiner

HYDROGEN PRODUCTION APPARATUS AND HYDROGEN PRODUCTION SYSTEM

CROSS-REFERENCE TO RELATED APPLICATION

This is a continuation application of International Application PCT/JP2015/077875, filed on Sep. 30, 2015; the entire contents of which are incorporated herein by reference.

FIELD

Embodiments relate to a hydrogen production apparatus and a hydrogen production system.

BACKGROUND

In recent years, efforts are being made to produce hydrogen using renewable energy. Renewable energy is energy that can be permanently replenished by the natural world, such as hydroelectric power, wind power, solar power, and the like. A hydrogen production apparatus is located near an electrical power generating facility using renewable energy, for example, a hydroelectric power station provided at a water resource such as a river or a dam, a wind power generating plant provided in a mountainous area, or solar panels installed in a desert, and the like. Then, electrolysis is carried out on the water using electrical power provided from the electrical power generating facility to produce hydrogen. The hydrogen produced is transported to the points of consumption, and there it is supplied to fuel cells and fuel cell vehicles. By establishing such a system, electrical power generation facilities can be established in remote areas where the existing electrical power system does not reach, and renewable energy can be effectively collected. Also, in many cases, renewable energy output is unstable, but by converting the electrical power into hydrogen, the energy can be easily stored, and it is not necessary for the time of generation and the time of consumption to be the same.

However, frequently the remote areas where these power generation facilities are constructed are cold areas, so frequently hydrogen production apparatuses are also located in cold areas. Also, it is not possible to connect the building that houses the hydrogen production apparatus to an existing electrical power system, so electrical power is supplied from the power generation facility using renewable energy. Therefore, when the supply of electrical power from the electrical power generation facility is stopped, not only is the hydrogen production apparatus stopped, but the air conditioning of the building that houses the hydrogen production apparatus is also stopped. As a result, the water within the pipes of the hydrogen production apparatus freeze, and there is a possibility that the pipes will be ruptured.

DETAILED DESCRIPTION

The hydrogen production apparatus according to an embodiment includes: a rectifier supplied with first electrical power from outside, and that outputs direct-current second electrical power; an electrolyzer supplied with the second electrical power and that carries out electrolysis of an alkaline aqueous solution; an electrolyzer that retains the alkaline aqueous solution; a pump that circulates the alkaline aqueous solution between the electrolyzer and the electrolyzer; a pure water tank that retains a pure water; a pure water pipe connected between the pure water tank and the electrolyzer, allowing the pure water to be distributed from the pure water tank to the electrolyzer; an inert gas cylinder that contains an inert gas; and a first valve connected between the inert gas cylinder and the pure water pipe, is the first valve being closed when the first electrical power is supplied, and being open when the first electrical power is not supplied. The inert gas is introduced into the pure water pipe by opening the first valve.

First Embodiment

First, a hydrogen production system according to a first embodiment and its peripheral configuration is described.

Figure 1:
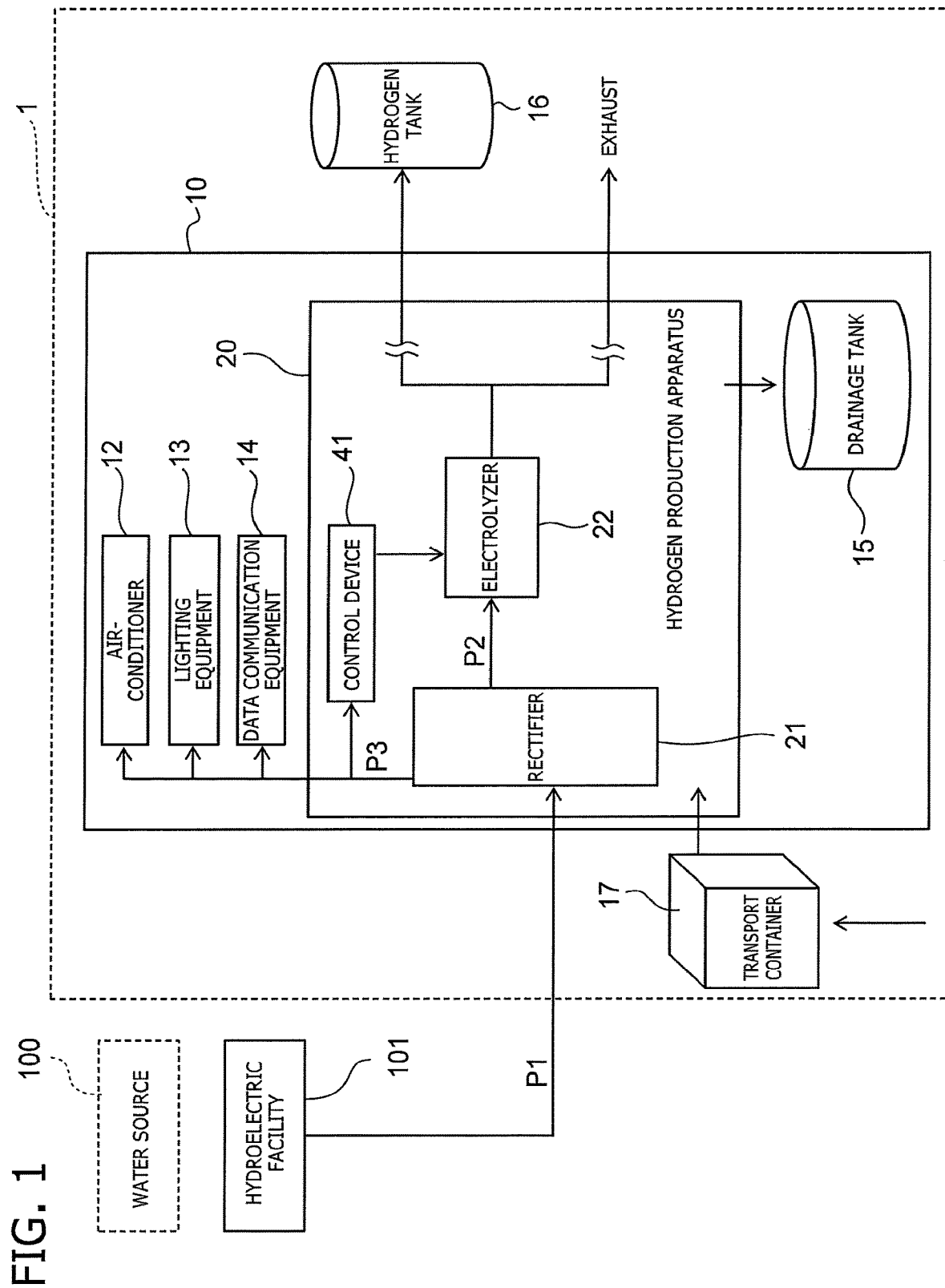
FIG. 1 is a block diagram illustrating a hydrogen production system according to a first embodiment.

FIG. 1 is a block diagram illustrating a hydrogen production system according to the embodiment.

The hydrogen production system according to the embodiment is a system that produces hydrogen gas by electrolysis of water using an alkaline electrolysis system.

As illustrated in FIG. 1, a hydrogen production system 1 according to the embodiment is installed near to a hydroelectric facility 101 associated with a water source 100 (for example, a river or dam or the like). In the embodiment, the hydrogen production system 1 is installed in a remote area in a cold mountainous region. Note that in the Specification, "remote area" refers to land not connected to an existing electrical power system. A remote area is land distant from cities such as a mountainous area or an isolated island or the like, and in many cases, remote areas do not have water supply or sewer systems installed. The hydroelectric facility 101 is a comparatively small power generating facility that outputs alternating current power P1.

A building 10 is provided in the hydrogen production system 1. A hydrogen production apparatus 20 is installed within the building 10. Also, an air-conditioner 12 that controls the temperature within the building 10, lighting equipment 13 that lights the inside and outside of the building 10, and data communication equipment 14 that collects operational data on the hydrogen production apparatus 20 and communicates with the outside are provided within the building 10. Note that apart from these, for example, domestic appliances and the like necessary for the operators may also be provided. In addition, a drainage tank 15 that stores wastewater discharged from the hydrogen production apparatus 20 is also provided within the building 10. The drainage tank 15 can be removed and replaced, and the removed drainage tank can be transported on a truck or the like. Details of the wastewater discharged into the drainage tank 15 are described later.

Also, in the hydrogen production system 1, a hydrogen tank 16 that stores hydrogen gas produced by the hydrogen production apparatus 20, and a transport container 17 that transports pure water to the hydrogen production apparatus 20 are provided outside the building 10. The transport container 17 is formed from stainless steel, for example, and has a substantially cuboidal shape. The length of one side is about 1 m, a manhole is installed on a top face, and a water outlet is installed on a bottom face. For example, a stainless steel container (sanitary and cold protection specification) available from Japan Logistic Ware can be used as the transport container 17. Note that the transport container 17 is not limited to being a stainless steel container, it may be a resin container, for example.

The hydrogen production system 1 is installed in a remote area, so it is not connected to an existing electrical power system or to water supply and sewer systems. Therefore, the necessary electrical power is all supplied from the hydroelectric facility 101. Also, there is no water supply system, so it is not possible to produce pure water, and the pure water necessary for producing hydrogen is produced in another location, filled into the transport container 17, and transported from the external other location by truck or the like (not illustrated in the drawings).

Note that when the hydrogen production system 1 is installed near to the water source 100, as in the embodiment, in some cases, it may be technically possible in terms of water technology to supply the water from the water source 100.

However, there will also be cases when it is difficult to produce the pure water used in the production of the hydrogen by directly obtaining the water from the water source 100, due to legal restrictions such as water utilization rights, or because the water quality is not suitable for production of pure water. Therefore, providing the mechanism that enables the pure water necessary for production of hydrogen to be supplied by transport from outside is preferred because it increases the number of areas in which the hydrogen production system 1 according to the embodiment can be introduced.

On the other hand, of the wastewater used at the hydrogen production system 1, for example, discharging the pure water into the water source 100 can be considered. However, depending on the requirements and the like of the area in which the hydrogen production system 1 is installed, it may not be possible to discharge even pure water from the hydrogen production system 1 from the point of view of environmental protection. In these cases, it is desirable that the wastewater be transported to an area in which it can be discharged after appropriate treatment. Therefore, in the hydrogen production system 1 according to the embodiment, wastewater is stored in the drainage tank 15 that can be removed as appropriate and can be transported by truck or the like (not illustrated in the drawings) to an area where the wastewater can be discharged. Also, the hydrogen gas stored in the hydrogen tank 16 is transported to the points of consumption by a hydrogen lorry (not illustrated in the drawings).

In other words, all the electrical power necessary for operation of the hydrogen production system 1 is from an electrical power generating facility using renewable energy, in other words, the electrical power is supplied from the hydroelectric facility 101. Also, the pure water necessary for electrolysis is produced in, for example, a pure water production factory in an industrial area, and is transported to the hydrogen production system 1 by truck or the like using the transport container 17. Also, after temporary storage in the drainage tank 15, the wastewater is transported off site by truck or the like. Then, the hydrogen gas is produced using pure water produced in another area and electrical power sourced from renewable energy, and the hydrogen gas produced is transported in a hydrogen lorry or the like, after storage in the hydrogen tank 16. In this way, the hydrogen production system 1 according to the embodiment is an infrastructure free system that does not require an existing electrical power system or water supply and sewer system. By realizing this configuration, the hydrogen production system 1 can be rapidly introduced without being affected by restrictions of infrastructure environment or natural environment or the like in the area in which the hydrogen production system 1 is installed.

Next, a configuration of the hydrogen production apparatus according to the embodiment is described.

Figure 2:
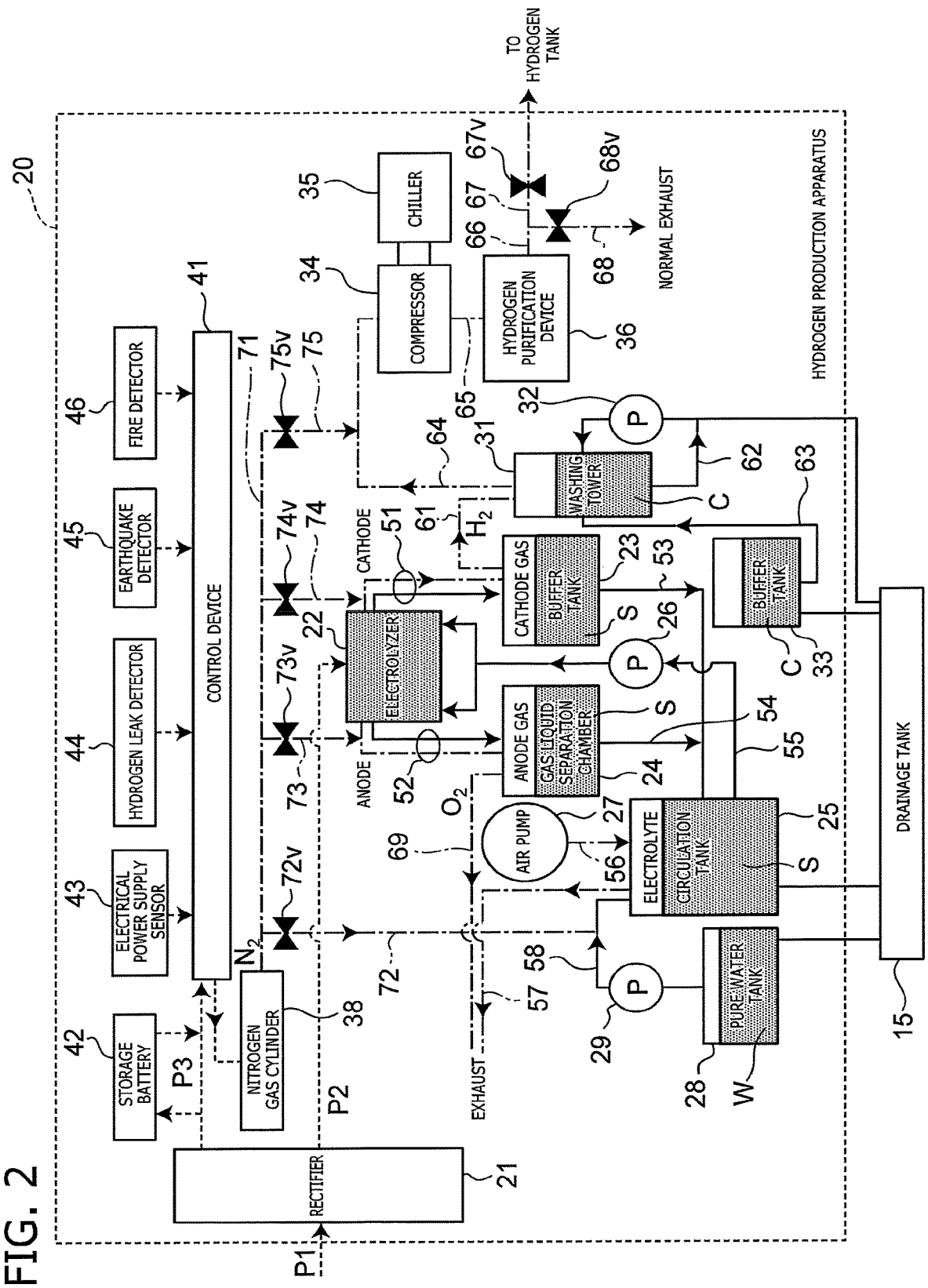
FIG. 2 is a system configuration diagram illustrating a hydrogen production apparatus according to the first embodiment.

FIG. 2 is a system configuration diagram illustrating a hydrogen production apparatus according to the embodiment.

Figure 3:
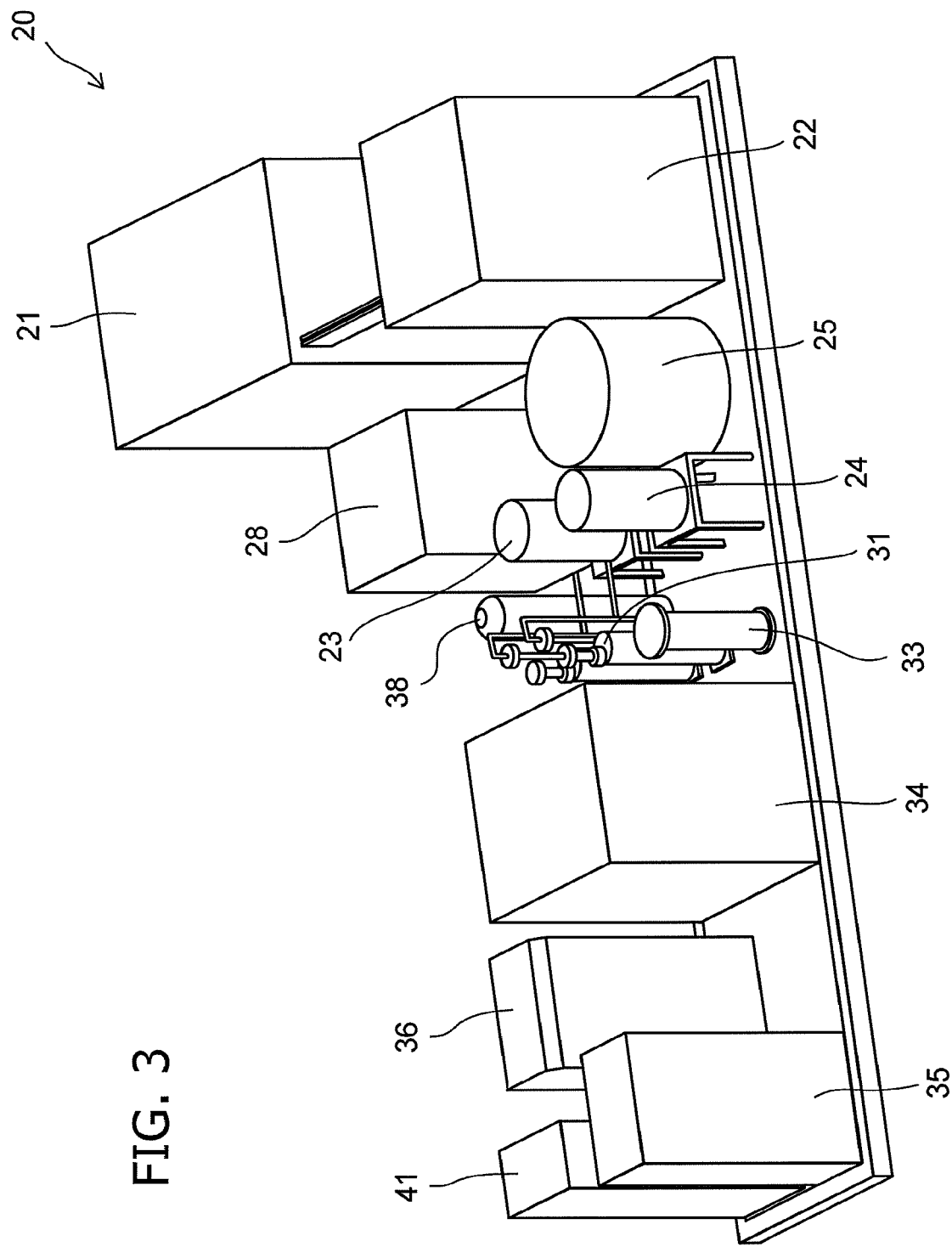
FIG. 3 is a perspective view illustrating the hydrogen production apparatus according to the first embodiment.

FIG. 3 is a perspective view illustrating the hydrogen production apparatus according to the embodiment.

Note that in FIG. 2, for convenience of illustration, the flow of electrical current and signals is indicated with a broken line, the flow of gas is indicated with a dot-dash line, and the flow of liquid is indicated with a solid line. Also, FIG. 3 only illustrates the comparatively large constitutive elements, and small constitutive elements and piping have been omitted.

As illustrated in FIGS. 2 and 3, a rectifier 21 is provided in the hydrogen production apparatus 20 according to the embodiment. Alternating current electrical power P1 is supplied from the hydroelectric facility 101 to the rectifier 21, which then outputs direct current electrical power P2 and alternating current electrical power P3. A portion of the alternating current electrical power P3 is supplied to pumps, a compressor 34, and the like described later. Another portion of the alternating current electrical power P3 is supplied to the air-conditioner 12, the lighting equipment 13, and the data communication equipment 14.

An electrolyzer 22, a cathode gas liquid separation chamber 23, an anode gas liquid separation chamber 24, and, an electrolyte circulation tank 25 are provided in the hydrogen production apparatus 20. The electrolyte circulation tank 25 is connected to the drainage tank 15.

The electrolyzer 22 holds an alkaline water solution S being the electrolyte, for example, a 25 mass % aqueous solution of potassium hydroxide (KOH). When direct current electrical power P2 is supplied from the rectifier 21, the alkaline water solution S is electrolyzed, and hydrogen gas ($H_2$) and oxygen gas ($O_2$) are generated. The interior of the electrolyzer 22 is partitioned into a plurality of cells by separating membranes (not illustrated in the drawings). The separating membranes allow water to pass through but virtually no gas is allowed to pass through. For example, the separating membranes are membranes produced by applying a polymer nonwoven fabric to both sides of a polymer film made from polyethylene terephthalate (PET). A cathode (not illustrated in the drawings) or an anode (not illustrated in the drawings) is disposed within each cell, with the separation membrane disposed therebetween. The electrolyzer 22 is sealed, and a first end of a hydrogen pipe 51 is connected to a ceiling portion of the cells in which the cathode is disposed, and a first end of an oxygen pipe 52 is connected to a ceiling portion of the cells in which the anode is disposed.

A second end of the hydrogen pipe 51 is connected to the cathode gas liquid separation chamber 23. In this way, the hydrogen gas mixed with the alkaline water solution S flows into the cathode gas liquid separation chamber 23 via the hydrogen pipe 51 from the electrolyzer 22. The hydrogen gas and the alkaline water solution S are separated within the cathode gas liquid separation chamber 23. In other words, the alkaline water solution S falls to the bottom of the cathode gas liquid separation chamber 23, and the hydrogen gas is collected at the top of the cathode gas liquid separation chamber 23.

A second end of the hydrogen pipe 51 is connected to the anode gas liquid separation chamber 24. In this way, the hydrogen gas mixed with the alkaline water solution S flows into the anode gas liquid separation chamber 24 via the hydrogen pipe 51 from the electrolyzer 22. The hydrogen gas and the alkaline water solution S are separated within the anode gas liquid separation chamber 24. In other words, the alkaline water solution S falls to the lower portion of the anode gas liquid separation chamber 24, and the hydrogen gas is collected at the top of the anode gas liquid separation chamber 24.

A first end of an electrolyte pipe 53 is connected to the lower portion of the cathode gas liquid separation chamber 23, for example, to a bottom face. A second end of the electrolyte pipe 53 is connected to the electrolyte circulation tank 25. A first end of an electrolyte pipe 54 is connected to a lower portion of the anode gas liquid separation chamber 24, for example, to a bottom face. A second end of the electrolyte pipe 54 is connected to the electrolyte circulation tank 25. In this way, the alkaline water solution S from the cathode gas liquid separation chamber 23 and the anode gas liquid separation chamber 24 flow into the electrolyte circulation tank 25.

The electrolyte circulation tank 25 holds the alkaline water solution S. A water level meter (not illustrated in the drawings) is provided in the electrolyte circulation tank 25. An electrolyte pipe 55 is connected between a lower portion of the electrolyte circulation tank 25 and a lower portion of the electrolyzer 22. A pump 26 is installed on the electrolyte pipe 55. Also, the alkaline water solution S is supplied to the electrolyzer 22 from the electrolyte circulation tank 25 via the electrolyte pipe 55 by the operation of the pump 26. In other words, the alkaline water solution S is circulated in the circuit (electrolyzer 22→cathode gas liquid separation chamber 23→anode gas liquid separation chamber 24→electrolyte circulation tank 25→electrolyzer 22) by the operation of the pump 26.

An air pump 27 is provided in the hydrogen production apparatus 20. An inlet of the air pump 27 is open to the atmosphere, and an air pipe 56 is connected between a discharge outlet of the air pump 27 and the electrolyte circulation tank 25. Also, a first end of an air pipe 57 is connected to an upper portion of the electrolyte circulation tank 25, for example, a ceiling portion. A second end of the air pipe 57 is disposed outside the building 10. In this way, when the air pump 27 operates, air within the electrolyte circulation tank 25 is discharged outside the building 10, and it is replaced with new air. Also, as a result of operation of the air pump 27, it is possible to discharge the alkaline water solution S held within the electrolyte circulation tank 25 to the drainage tank 15.

A pure water tank 28 that retains pure water W is provided in the hydrogen production apparatus 20. A pure water pipe 58 is connected between a lower portion of the pure water tank 28, for example, a bottom face, and an upper portion of the electrolyte circulation tank 25, for example, a ceiling portion. A pump 29 is installed on the pure water pipe 58. The pure water W is supplied from the pure water tank 28 to the electrolyte circulation tank 25 via the pure water pipe 58 as a result of operation of the pump 29. The electrical conductivity of the pure water W is, for example, 10 μS/cm (microsiemens per centimeter). The pure water tank 28 is also connected to the drainage tank 15 (see FIG. 1).

A washing tower 31, a pump 32, and a buffer tank 33 are provided in the hydrogen production apparatus 20. A hydrogen pipe 61 is connected between an upper portion of the cathode gas liquid separation chamber 23, for example, a ceiling portion, and the washing tower 31. The washing tower 31 removes alkaline components from the hydrogen gas separated by the cathode gas liquid separation chamber 23 and supplied by the hydrogen pipe 61, by spraying washing liquid C in a shower. The washing liquid C is, for example, pure water.

Also, the pump 32 circulates the washing liquid C held within the washing tower 31. The washing tower 31 and the pump 32 are configured into a closed loop circuit by a washing liquid pipe 62. The buffer tank 33 holds washing liquid C, and supplies the washing liquid C to the washing tower 31 when necessary. A washing liquid pipe 63 is connected between the washing tower 31 and the buffer tank 33. The buffer tank 33 is also connected to the drainage tank 15.

In addition, the compressor 34, a chiller 35, and a hydrogen purification device 36 are provided in the hydrogen production apparatus 20. An upper portion, for example, a ceiling portion, of the washing tower 31 and an inlet of the compressor 34 are connected by a hydrogen pipe 64. The compressor 34 compresses the hydrogen gas discharged from the washing tower 31 and supplied via the hydrogen pipe 64. The chiller 35 cools the compressor 34. A hydrogen pipe 65 is connected between a discharge outlet of the compressor 34 and an inlet of the hydrogen purification device 36. The hydrogen purification device 36 purifies the hydrogen gas compressed by the compressor 34 and supplied via the hydrogen pipe 65. A filter (not illustrated in the drawings) that chemically adsorbs and removes impurities in the hydrogen gas, for example, moisture, is provided in the hydrogen purification device 36.

A first end of a hydrogen pipe 66 is connected to a discharge outlet of the hydrogen purification device 36. The hydrogen pipe 66 branches into two, to become a hydrogen pipe 67 and a hydrogen pipe 68. The hydrogen pipe 67 is connected to the hydrogen tank 16 (see FIG. 1). A normally closed valve 67v is provided on the hydrogen pipe 67. A normally closed valve is a valve in the "closed" state when it is demagnetized, in other words, when a predetermined voltage is not applied, and in the "open" state as a result of the action of an electromagnet when magnetized, in other words, when a predetermined voltage is applied. A second end of the hydrogen pipe 68 is a discharge outlet open to the outside of the hydrogen production apparatus 20, for example, to the outside of the building 10. A normally open valve 68v is provided on the hydrogen pipe 68. A normally open valve is a valve in the "open" state when it is demagnetized, and in the "closed" state as a result of the action of an electromagnet when magnetized.

A first end of an oxygen pipe 69 is connected to an upper portion, for example, a ceiling portion, of the anode gas liquid separation chamber 24. A second end of the oxygen pipe 69 is a discharge outlet open to the outside of the hydrogen production apparatus 20, for example, to the outside of the building 10.

A nitrogen gas cylinder 38 is provided in the hydrogen production apparatus 20. High pressure nitrogen gas is sealed within the nitrogen gas cylinder 38. Note that an inert gas other than nitrogen gas may be sealed within the nitrogen gas cylinder 38. A nitrogen pipe 71 is connected to the nitrogen gas cylinder 38 via a regulator (not illustrated in the drawings) that regulates the pressure of the outflow gas to be constant. The pressure of the regulator is set to, for example, 0.2 megapascals (MPa). The nitrogen pipe 71 branches into nitrogen pipes 72 to 75.

The nitrogen pipe 72 is connected to the pure water pipe 58. A normally open valve 72v is provided on the nitrogen pipe 71. The nitrogen pipe 73 is connected to the oxygen pipe 52. A normally open valve 73v is provided on the nitrogen pipe 73. The nitrogen pipe 74 is connected to the hydrogen pipe 51. A normally open valve 74v is provided on the nitrogen pipe 74. The nitrogen pipe 75 is connected to the hydrogen pipe 64. A normally open valve 75v is provided on the nitrogen pipe 75. Also, a bypass pipe (not illustrated in the drawings) that communicates with the outside of the building 10 is connected to the upper portion of the electrolyzer 22, the upper portion of the cathode gas liquid separation chamber 23, the hydrogen pipe 51, the oxygen pipe 52, the hydrogen pipe 61, the hydrogen pipe 64, and the hydrogen pipe 65. A normally open valve is provided on each bypass pipe. Each of the valves referred to above is controlled by a control device 41.

The control device 41 that controls the operation of the hydrogen production apparatus 20, a storage battery 42 that supplies electrical power to the control device 41 in an electrical power stoppage, an electrical power supply sensor 43 that detects a stoppage in the supply of the electrical power P1, a hydrogen leak detector 44 that detects leakages of hydrogen gas, an earthquake detector 45 that detects earthquakes, and a fire detector 46 that detects fires are provided in the hydrogen production apparatus 20.

The control device 41 is operated by alternating current electrical power P3 generated by the rectifier 21, and the control device 41 controls the operation of each part of the hydrogen production apparatus 20. Specifically, the control device 41 switches to control whether direct current electrical power P2 is supplied to the electrolyzer 22; switches to control whether the alternating current electrical power P3 is supplied to the pump 26, the air pump 27, the pump 29, and the pump 32; and switches to control whether the normally closed valve 67v, the normally open valves 68v, 72v, 73v, 74v, and 75v, and the normally open valves provided on each of the bypass pipes is magnetized or demagnetized.

The electrical power supply sensor 43 outputs an alarm signal to the control device 41 when the supply of alternating current electrical power P1 from the hydroelectric facility 101 is stopped. The hydrogen leak detector 44 is installed, for example, near the compressor 34, and when a leakage of hydrogen gas is detected, it outputs an alarm signal to the control device 41. For example, a GD-70D available from Riken Keiki Co., Ltd. can be used as the hydrogen leak detector 44. The earthquake detector 45 detects an earthquake when an earthquake equal to or greater than a predetermined intensity has occurred, and outputs an alarm signal to the control device 41. For example, a D7G-F122 manufactured by Omron Corporation can be used as the earthquake detector 45. The fire detector 46 is installed in suitable locations in the building 10, and when a fire is detected, an alarm signal is output to the control device 41. As necessary, the electrical power supply sensor 43, the hydrogen leak detector 44, the earthquake detector 45, and the fire detector 46 may be supplied with electrical power from the control device 41.

Next, the operation of the hydrogen production system according to the embodiment, in other words, the hydrogen production method according to the embodiment, is described.

<Normal Operation>

First, the normal operation of the hydrogen production system 1 is described.

As illustrated in FIG. 1, the hydroelectric facility 101 installed on the water source 100 generates alternating current electrical power P1. As a rule, the hydroelectric facility 101 generates the alternating current electrical power P1 continuously, and supplies it to the rectifier 21 of the hydrogen production apparatus 20.

As illustrated in FIGS. 1 to 3, the rectifier 21 converts the alternating current electrical power P1 into direct current electrical power P2 and alternating current electrical power P3. The rectifier 21 outputs the alternating current electrical power P3 to the control device 41, the storage battery 42, the pumps 26, 29, and 32, the air pump 27, and the compressor 34 of the hydrogen production apparatus 20. Also, the rectifier 21 outputs the alternating current electrical power P3 to the air conditioner 12, the lighting equipment 13, and the data communication equipment 14. In this way, the temperature within the building 10 is maintained within a predetermined range, the inside and the outside of the building 10 is lit, operational data on the hydrogen production apparatus 20 is collected, and transmitted to the outside when necessary.

Under the initial state, the alkaline water solution S is held within the electrolyte circulation tank 25 and the electrolyzer 22. The alkaline water solution S is, for example, a 25 mass % aqueous solution of potassium hydroxide. Also, pure water under W is held within the pure water tank 28. The pure water W is enclosed in the transport container 17, and is transported onto the site from outside using a truck or the like (not illustrated in the drawings). In addition, the washing liquid C is held within the washing tower 31 and the buffer tank 33.

Also, the control device 41 applies a predetermined voltage to the normally closed valve 67v, and, the normally open valves 68v, 72v, 73v, 74v, and 75v to magnetize them. In this way, the normally closed valve 67v is opened and communicates with the hydrogen pipe 68. On the other hand, the normally open valves 68v, 72v, 73v, 74v, and 75v are closed. As a result, the hydrogen purification device 36 is connected to the hydrogen tank 16 via the hydrogen pipes 66 and 67. Also, the nitrogen gas cylinder 38 is not connected to anything, so it is in the sealed state. Also, the normally open valves provided on each of the bypass pipes are magnetized and in the closed state. In this way, each of the bypass pipes is closed.

In this state, the control device 41 operates the pump 26, the pump 32, the compressor 34, and the chiller 35. As a result of operation of the pump 26, the alkaline water solution S in the electrolyte circulation tank 25 is supplied to the electrolyzer 22 via the electrolyte pipe 55. As a result of operation of the pump 32, the washing liquid C is circulated between the washing tower 31 and the pump 32, and the washing liquid C is sprayed into the gas phase in the upper portion of the washing tower 31. As a result of operation of the compressor 34, the gas drawn into the inlet of the compressor 34 is compressed and discharged from the outlet. As a result of operation of the chiller 35, the compressor 34 is cooled.

Then, the control device 41 supplies the direct current electrical power P2 from the rectifier 21 to the electrolyzer 22. In this way, current flows between the cathode and the anode of the electrolyzer 22, and the water in the alkaline water solution S is electrolyzed, and hydrogen gas is generated at the cathode side, and oxygen gas is generated at the anode side. As a result, water within the alkaline water solution S in the electrolyzer 22 is consumed, and hydrogen gas accumulates in the top portion of the cell that includes the cathode, and oxygen gas accumulates in the top portion of the cell that includes the anode.

Then, hydrogen gas and the alkaline water solution S are forced from the upper portion of the cell that includes the cathode in the electrolyzer 22, and flows into the cathode gas liquid separation chamber 23 via the hydrogen pipe 51, where the hydrogen gas and the alkaline water solution S are separated. Also, oxygen gas and the alkaline water solution S are forced from the upper portion of the cell that includes the anode in the electrolyzer 22, and flows into the anode gas liquid separation chamber 23 via the oxygen pipe 52, where the oxygen gas and the alkaline water solution S are separated.

The alkaline water solution S that accumulates in the cathode gas liquid separation chamber 23 returns to the electrolyte circulation tank 25 via the electrolyte pipe 53. Also, the alkaline water solution S that accumulates in the anode gas liquid separation chamber 24 returns to the electrolyte circulation tank 25 via the electrolyte pipe 54. In this way, the alkaline water solution S is circulated in the circuit (electrolyte circulation tank 25→electrolyzer 22→cathode gas liquid separation chamber 23→electrolyte circulation tank 25, and the circuit electrolyte circulation tank 25→electrolyzer 22→anode gas liquid separation chamber 24→electrolyte circulation tank 25) by the operation of the pump 26.

At this time, the water in the alkaline water solution S is reduced by the electrolysis, so the water level in the electrolyte circulation tank 25 drops. Therefore, the pump 29 is operated and the electrolyte circulation tank 25 is replenished with pure water W from the pure water tank 28 via the pure water pipe 58, based on the output of the water level meter installed in the electrolyte circulation tank 25. As a result, the concentration of the alkaline water solution S is always maintained within a constant range.

The oxygen gas separated by the anode gas liquid separation chamber 24 is discharged outside the building 10 via the oxygen pipe 69. Also, the hydrogen gas separated by the cathode gas liquid separation chamber 23 is fed into the washing tower 31 via the hydrogen pipe 61. The hydrogen gas is fed into the washing tower 31 and subjected to a shower of the washing liquid C, and the residual alkaline components are dissolved in the washing liquid C and removed. As a result, the purity of the hydrogen gas is improved.

The hydrogen gas from which the alkaline components have been removed within the washing tower 31 is fed to the compressor 34 via the hydrogen pipe 64, where it is compressed to, for example, 0.8 MPa (megapascals), and fed to the hydrogen purification device 36. In the hydrogen purification device 36, impurities such as moisture and the like are removed by passing the hydrogen gas through a filter. Then, the hydrogen gas is fed to the hydrogen tank 16 via the hydrogen pipes 66 and 67, and is stored within the hydrogen tank 16. In this way, hydrogen gas can be produced by supplying external electrical power and pure water to the hydrogen production system 1. For example, a hydrogen lorry is filled from time to time with the hydrogen gas stored in the hydrogen tank 16, and transported to the points of consumption.

On the other hand, when the alkaline water solution S is degraded by the electrolysis of the water, it is discharged from the electrolyte circulation tank 25 to the drainage tank 15. At this time, new alkaline water solution S is transported in via a truck or the like different from the truck used for the pure water W, and the electrolyte circulation tank 25 is replenished. Also, when the purity of the pure water W accumulated in the pure water tank 28 drops below a standard value as a result of variations with time and the like, the pure water W is discharged from the pure water tank 28 to the drainage tank 15. New pure water W is transported in by truck or the like in transport containers 17, and the pure water tank 28 is replenished. In addition, when the washing liquid C is contaminated in excess of a predetermined criterion due to the solution of alkaline components, it is discharged from the buffer tank 33 to the drainage tank 15. Then, new washing liquid C is transported in by truck or the like, and the buffer tank 33 is replenished. The drainage tank 15 in which the wastewater is stored in this way is removed from the hydrogen production system 1 as appropriate, and replaced with an empty drainage tank 15. The drainage tank 15 storing the wastewater is transported by truck or the like to a place where the wastewater can be discharged, and there the wastewater is discharged.

<Operation in Power Stoppages>

Next, the operation when the supply of alternating current electrical power P1 is stopped will be described.

For example, it is envisaged that the supply of alternating current electrical power P1 is interrupted due to drought of the water source 100, a breakdown of the hydroelectric facility 101, problems with the electrical power transmission equipment, and the like. In this case, because the hydrogen production system 1 is not connected to an existing electrical power system, but relies completely on the hydroelectric facility 101 for all the electrical power, when the alternating current electrical power P1 is stopped, the hydrogen production apparatus 20 stops, and the air conditioner 12 of the building 10 also stops. In such cases, there is reserve electrical power accumulated in the storage battery 42, so it is possible to operate the control device 41 for a certain amount of time. However, the capacity of the storage battery 42 is small, so electrolysis of the water cannot continue with the storage battery 42.

Also, the hydrogen production system 1 is installed in a cold area, so if the air-conditioner 12 is stopped, there is a possibility that the temperature within the building 10 will drop below freezing point. In this case, the temperature within the hydrogen production apparatus 20 will also drop below freezing point at some time. In this case, the freezing point of the alkaline water solution S is considerably lower than 0° C., so the potential for freezing of the alkaline water solution S is low. However, the freezing point of the pure water W is near 0° C., so the potential for freezing of the pure water W is high. Also, in the case where the pure water W in the pure water pipe 58 freezes, its volume will expand, and there is a possibility of rupture of the pure water pipe 58.

Also, in the case where the hydrogen production apparatus 20 stops, hydrogen gas will remain within the hydrogen gas circuit within the hydrogen production apparatus 20, in other words, within the hydrogen pipe 51, the cathode gas liquid separation chamber 23, the hydrogen pipe 61, the washing tower 31, the hydrogen pipe 64, the compressor 34, the hydrogen pipe 65, the hydrogen purification device 36, the hydrogen pipe 66, and the hydrogen pipe 67. Hydrogen gas is explosive, so it is dangerous for it to remain within the stopped apparatus.

Therefore, in the hydrogen production apparatus 20 according to the embodiment, when the electrical power supply sensor 43 detects that the alternating current electrical power P1 is not being supplied, an alarm signal is output to the control device 41. As stated above, the control device 41 can operate for a certain period of time with the electrical power stored in the storage battery 42.

After receiving the alarm signal from the electrical power supply sensor 43, the control device 41 switches all parts of the hydrogen production apparatus 20, in other words, the electrolyzer 22 and each of the pumps, to off. In this way, the hydrogen production apparatus 20 will not be unintentionally restarted even when later the supply of the electrical power P1 restarts. Also, the control device 41 demagnetizes the normally closed valve 67v and the normally open valve 68v. In this way, the normally closed valve 67v is closed, and the normally open valve 68v is opened, so the route of the hydrogen pipe 66 is switched, the connection to the hydrogen tank 16 is closed, and the hydrogen pipe 66 communicates with the outside via the hydrogen pipe 68.

Also, the control device 41 demagnetizes the normally open valves 72v, 73v, 74v, and 75v, so that they are opened. In this way, the nitrogen gas within the nitrogen gas cylinder 38 is supplied to each part of the hydrogen production apparatus 20 via the nitrogen pipes 71 to 75. At this time, the pressure of the nitrogen gas flowing from the nitrogen gas cylinder 38 is maintained at, for example, 0.2 MPa or higher by the regulator. Also, the control device 41 demagnetizes the normally open valves on each of the bypass pipes, so that they are opened. In this way, each hydrogen pipe communicates with the outside of the building 10.

Specifically, the nitrogen gas is supplied to the inside of the pure water pipe 58 via the nitrogen pipes 71 and 72. In this way, the interior of the pure water pipe 58 is purged with the nitrogen gas, and the pure water W remaining within the pure water pipe 58 is forced into the pure water tank 28 and the electrolyte circulation tank 25. In other words, the normally open valve 72v is a valve connected between the nitrogen gas cylinder 38 and the pure water pipe 58, and when the alternating current electrical power P1 is supplied, the normally open valve 72v is magnetized and closed, and when the alternating current electrical power P1 is not supplied, the normally open valve 72v is demagnetized and opened. By opening the normally open valve 72v, nitrogen gas is introduced into the pure water pipe 58, and the interior of the pure water pipe 58 is purged with the nitrogen gas. As a result, it is possible to avoid freezing of the pure water in the pure water pipe 58, and prevent rupture of the pure water pipe 58. Note that the pure water W within the pure water pipe 58 may be discharged into the drainage tank 15, and not into the pure water tank 28. Also, even in the case where the pure water freezes within the pure water tank 28, there is a gas portion in the upper portion of the pure water tank 28, so the pure water tank 28 will not rupture. Therefore, it is not necessary to discharge the pure water W from within the pure water tank 28.

Note that "the interior of the pure water pipe 58 is purged with the nitrogen gas" does not necessarily mean that all the pure water W within the pure water pipe 58 is discharged. In order to prevent rupture of the pure water pipe 58 due to freezing of the pure water W, there should be a gas portion within the pure water pipe 58 capable of absorbing the volumetric expansion when the pure water W freezes within the pure water pipe 58. Therefore, there is no problem in a case where a portion of the pure water W remains within the pure water pipe 58. For example, in a case where the nitrogen gas flows out from both ends of the pure water pipe 58 after the normally open valve 72v has been opened, it can be said that the interior of the pure water pipe 58 has been purged by the nitrogen gas.

Also, nitrogen gas is introduced into the oxygen pipe 52 via the nitrogen pipes 71 and 73. In this way, the oxygen gas remaining within the oxygen gas circuit of the hydrogen production apparatus 20, in other words, within the oxygen pipe 52, the anode gas liquid separation chamber 24, and the oxygen pipe 69 is purged with the nitrogen gas, and discharged to the outside of the building 10. As a result, the danger caused by the residual oxygen gas can be eliminated.

Also, nitrogen gas is introduced into the hydrogen pipe 51 via the nitrogen pipes 71 and 74. Also, nitrogen gas is introduced into the hydrogen pipe 64 via the nitrogen pipes 71 and 75. In this way, the hydrogen gas circuit of the hydrogen production apparatus 20 is purged with the nitrogen gas, and the hydrogen gas remaining within the hydrogen gas circuit is discharged to the outside of the building 10 via the hydrogen pipe 68 and each of the bypass pipes.

In other words, the normally open valve 74v is a valve connected between the nitrogen gas cylinder 38 and the hydrogen pipe 51, and when the alternating current electrical power P1 is supplied, the normally open valve 74v is magnetized and closed, and when the alternating current electrical power P1 is not supplied, the normally open valve 74v is demagnetized and opened. By opening the normally open valve 74v, the interior of the hydrogen pipe 51 is purged with the nitrogen gas. Also, the normally open valve 75v is a valve connected between the nitrogen gas cylinder 38 and the hydrogen pipe 64, and when the alternating current electrical power P1 is supplied, the normally open valve 75v is magnetized and closed, and when the alternating current electrical power P1 is not supplied, the normally open valve 75v is demagnetized and opened. By opening the normally open valve 75v, the interior of the hydrogen pipe 64 is purged with the nitrogen gas. As a result, it is possible to avoid the danger that the remaining hydrogen gas will explode. In this case, "purge" may be taken to be reducing the concentration of the hydrogen gas within the hydrogen gas circuit to less than the explosive limit of 4%, and it is not necessary to replace all the hydrogen gas within the hydrogen gas circuit with the nitrogen gas.

In this way, in the hydrogen production system 1, even when the supply of the alternating current electrical power P1 is stopped, it is possible to prevent rupture of the pure water pipe 58 due to freezing of the pure water W, by eliminating the pure water W from the pure water pipe 58. Also, it is possible to eliminate the danger of explosion and the like by eliminating the hydrogen gas and oxygen gas within the hydrogen production apparatus 20.

Note that in the case where the supply of electrical power is stopped, each of the valves is demagnetized, so the normally closed valve 67v is automatically closed, and the normally open valves 68v, 72v, 73v, 74v, and 75v, as well as the normally open valves provided on each of the bypass valves are automatically opened. Also, the pressure source for the pressure of the nitrogen gas is the pressure of the nitrogen gas itself within the nitrogen gas cylinder 38, and the pressure is adjusted by the regulator before it is supplied. However, this pressure is higher than the pressure of the hydrogen gas generated from the electrolyzer 22, and the pressure of the pure water supplied to the electrolyte circulation tank 25. Therefore, the pure water W and the hydrogen gas can be expelled from within the various pipes. Therefore, even in the event that the control device 41 does not operate for any reason, each of the valves is appropriately switched, the nitrogen gas is supplied, and the purging by the nitrogen gas as described above can be carried out.

<Operation in Emergency Other than Power Stoppage>

Next, the operation in the event of occurrence of an emergency situation other than a stoppage is described.

For example, in a case where there is a leakage of the hydrogen gas from the hydrogen production apparatus 20, not dealing with this situation leads to a possibility that the accumulated hydrogen will explode. Therefore, in the hydrogen production system 1 according to the embodiment, the hydrogen leak detectors 44 are installed. When a leakage of hydrogen gas is detected by the hydrogen leak detector 44, it outputs an alarm signal to the control device 41. In this way, the control device 41 stops the electrolyzer 22 and each of the pumps, and electrolysis of the water is stopped. Then, the pure water pipe 58, the hydrogen gas circuit, and the oxygen gas circuit are purged with nitrogen gas, by demagnetizing each of the valves, the same as in a stoppage as described above. In this way, leakage of the hydrogen gas is stopped, and the occurrence of an explosion accident can be prevented.

Also, in a case where an earthquake occurs, and a portion of the hydrogen production apparatus 20 is damaged, or the building 10 collapses, there is a possibility of leakage of the hydrogen gas. Also, there is a possibility that the earthquake will cause a fire, and that the leaked hydrogen gas will ignite and cause an explosion. Therefore, in the hydrogen production system 1 according to the embodiment, the earthquake detector 45 is installed. When the earthquake detector 45 detects an earthquake equal to or greater than a predetermined intensity, the earthquake detector 45 outputs an alarm signal to the control device 41. In this way, the control device 41 stops the electrolyzer 22 and each of the pumps, and electrolysis of the water is stopped, the same as in the case of hydrogen gas leakage as described above. Also, the pure water pipe 58, the hydrogen gas circuit, and the oxygen gas circuit are purged with nitrogen gas, by demagnetizing each of the valves. As a result, leakage of hydrogen gas can be prevented. Note that when an earthquake occurs, there is a possibility that the supply of the alternating current electrical power P1 will also be stopped. In this case also, purging with nitrogen gas can be carried out either by operating the control device 41 with the storage battery 42, or by automatically demagnetizing each of the valves, the same as in a stoppage as described above.

In addition, when a fire occurs in the building 10, there is a possibility that the fire will be applied to the hydrogen gas in the hydrogen production apparatus 20, which could cause an explosion accident. Therefore, in the hydrogen production system 1 according to the embodiment, when a fire occurs within the building 10, the fire detector 46 outputs an alarm signal to the control device 41. Then, the control device 41 takes the same measures as when there is a leakage of hydrogen gas as described above. At this time, it is possible to prevent the discharged hydrogen gas from igniting within the building 10 and the discharged oxygen gas from promoting the fire, by discharging the hydrogen gas and the oxygen gas within the hydrogen production apparatus 20 to the outside of the building 10.

Note that in the case where the supply of electrical power is stopped, each of the valves is demagnetized. Therefore, even in the event that the control device 41 is destroyed due to earthquake or fire, each of the valves is appropriately switched, the nitrogen gas is supplied, and the purging by the nitrogen gas as described above can be carried out.

Next, the effects of the embodiment will be described.

In the embodiment, in a stoppage, the pure water W is automatically discharged from inside the pure water pipe 58, so even in a case where the ambient temperature drops thereafter, it is possible to prevent freezing of pure water W within the pure water pipe 58 and rupturing of the pure water pipe 58. Therefore, the hydrogen production system 1 can be operated unmanned. It is assumed that the hydrogen production system 1 according to the embodiment is installed in a remote area and a cold area not connected to an existing electrical power system, but it is difficult to permanently station operators in such an area. Therefore, in a case where unmanned operation of the hydrogen production system 1 is possible, the hydrogen production system can be easily spread into areas where renewable energy can be obtained. As a result, renewable energy as a percentage of the total public electrical power demand can be increased.

Also, in the embodiment, even in the event of occurrence of problems such as a leakage of hydrogen gas, or earthquake and fire, the hydrogen production apparatus 20 is automatically stopped, and the hydrogen gas remaining within the hydrogen production apparatus 20 can be discharged. In this way, the occurrence of an explosion accident due to residual hydrogen gas can be prevented. In addition, unmanned operation is easy, so deployment of the hydrogen production system 1 is easy.

In addition, the hydrogen production system 1 according to the embodiment is supplied with all the electrical power necessary for operation from the hydroelectric facility 101, and the necessary pure water and the like is transported by truck or the like from outside into the facility using the transport container 17, and after the wastewater that unavoidably is generated is stored in the drainage tank 15, it is discharged by truck or the like. In this way, the hydrogen production system 1 is an infrastructure free system that can be semi-independently operated. Therefore, the hydrogen production system 1 can be installed in a remote area with no existing electrical power system or water supply or sewer system.

Also, because the hydrogen production system 1 can be semi-independently operated, there is almost no effect on the environment in which it is installed. Specifically, there is no intake of the water resources and the like in that area, and there is no discharge of wastewater, so the effect on the natural environment is extremely small. Therefore, it is possible to comply with the laws and regulations relating to conservation of the natural environment.

In addition, in the embodiment, water is electrolyzed using the alkaline aqueous solution. As stated previously, the freezing point of the alkaline aqueous solution is lower than that of pure water, so it is difficult to freeze even in a cold area. Therefore, in the embodiment, freezing of the pure water may be prevented by just adding it to the alkaline aqueous solution. In contrast, with electrolysis of water using solid electrolyte membranes, pure water is used as the electrolyte, so it is necessary to take some measure to prevent freezing of the pure water.

Also, in the case of an alkaline electrolysis system, the electrical conductivity required of the pure water is 10 µS/cm or less. In contrast, in the case of a solid electrolyte membrane system, the electrical conductivity required of the pure water is 5 µS/cm or less. In other words, the degree of purity required for the pure water is lower for the alkaline electrolysis system compared with the solid electrolyte membrane system. Also, in the case of the solid electrolyte membrane system, solid electrolyte membranes that include platinum powder are required, but in the case of the alkaline electrolyte system, such expensive components are not necessary. For these reasons, the cost of the alkaline electrolysis system is lower compared with the solid electrolyte membrane system.

In addition, in the embodiment, the pure water W is supplied to the hydrogen production system 1 from the outside using the stainless steel transport containers 17. The transport containers 17 made from stainless steel reduce the permeation of impurities that reduce the degree of purity of the pure water, for example, carbon dioxide gas and oxygen gas and the like. In addition, solution of components from the transport container 17 itself into the pure water W is extremely low. Therefore, the degree of purity of the pure water can be maintained for a long period of time by using the transport containers 17 made from stainless steel. In this way, the degree of purity of the pure water can be maintained at or above the required standard, even when the amount of time required for transport of the pure water is greater than anticipated due to, for example, weather conditions. In this way, the degree of freedom of operation of the hydrogen production system 1 is improved.

Note that in the embodiment, in a case where a liquid has a freezing point higher than the lowest envisaged temperature of the environment, for example, pure water or an aqueous solution with low concentration is used as the washing liquid C, the washing liquid pipes 62 and 63 may be connected to nitrogen pipes that are connected to the nitrogen gas cylinder 38, normally open valves may be installed on these nitrogen pipes, and the lowest part of the washing liquid pipe 62 and the lowest part of the washing liquid pipe 63 may be connected to the drainage tank 15 via normally open valves. In this way, the interiors of the washing liquid pipes 62 and 63 will be purged with nitrogen gas in an electrical power stoppage, and the washing liquid C within the washing liquid pipes 62 and 63 can be discharged into the drainage tank 15, and rupture of the washing liquid pipes 62 and 63 due to freezing of the washing liquid C can be prevented.

Second Embodiment

Next, a second embodiment will be described.

The hydrogen production system according to the embodiment is a system that uses wind power as the renewable energy.

Figure 4:
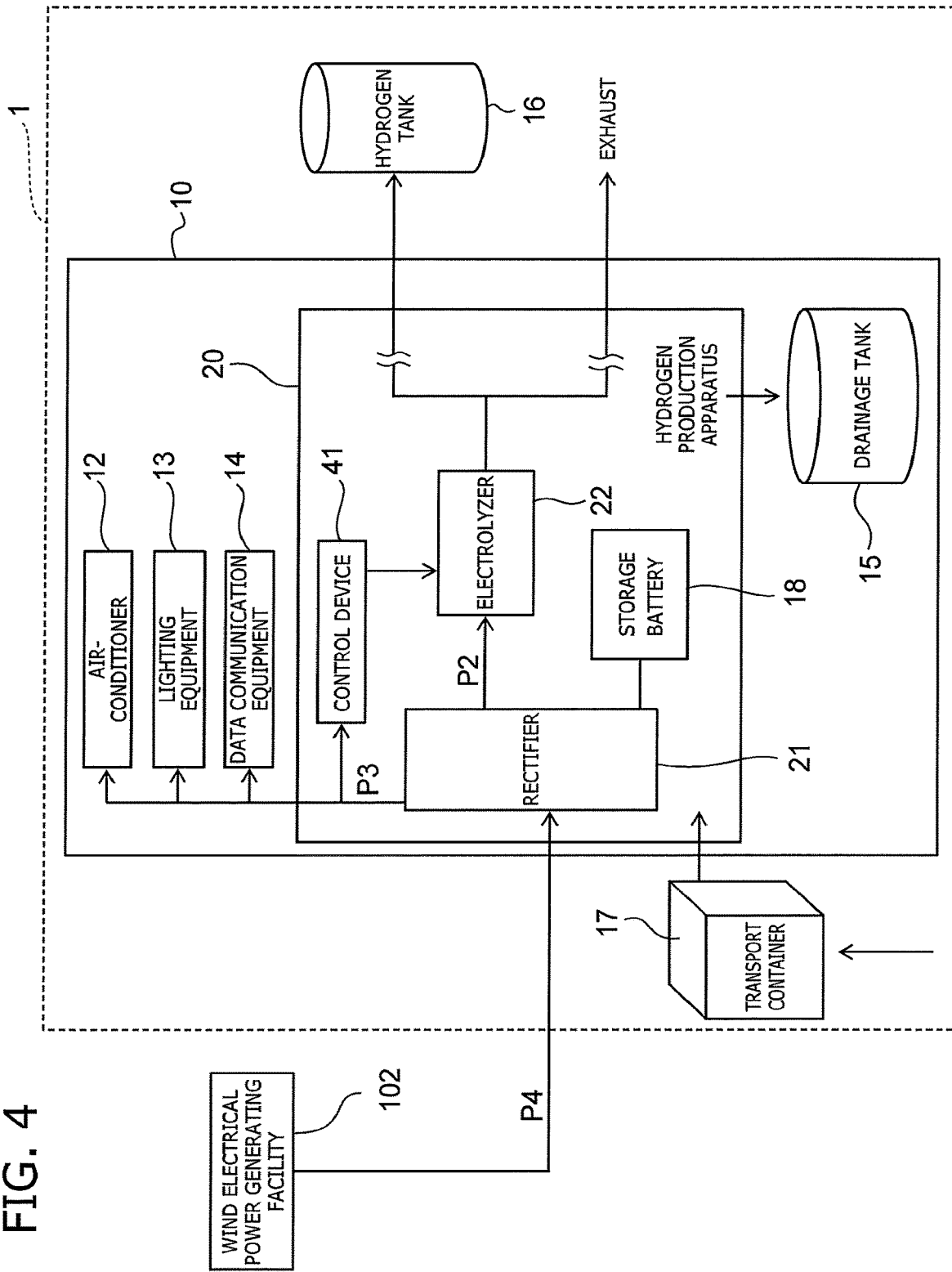
FIG. 4 is a block diagram illustrating a hydrogen production system according to a second embodiment.

FIG. 4 is a block diagram illustrating a hydrogen production system according to the embodiment.

As illustrated in FIG. 4, a hydrogen production system 2 according to the embodiment is provided with alternating current electrical power P4 from a wind electrical power generating facility 102. The wind electrical power generating facility 102 is installed on location where the wind is strong, for example, in a mountainous area or the like, and is provided with wind turbines. However, the supply of alternating current electrical power P4 is intermittent. Also, in the hydrogen production system 2, a large scale storage battery 18 is provided, connected to the rectifier 21. The capacity of the storage battery 18 is greater than the capacity of the storage battery 42 (see FIG. 2), and is capable of continuing the electrolysis by the hydrogen production apparatus 20 for a certain period of time.

According to the embodiment, by providing the storage battery 18, electrical power can be supplied to the rectifier 21 for a certain period of time, even when the wind has stopped. In this way, it is possible to determine that there is an electrical power stoppage every time the wind stops, prevent the hydrogen production apparatus 20 from stopping, and prevent purges from being carried out on each of the pipes. Note that even when the electrical power accumulated in the storage battery 18 has been used up and the electrical power supply from the wind electrical power generating facility 102 has not restarted, the hydrogen production apparatus 20 can be stopped and each of the pipes purged with nitrogen gas by the same operation as for the first embodiment described previously, in order to prevent freezing of the pure water.

The hydrogen production system 2 according to the embodiment can be installed on an isolated island or the like. Also, in a case where the hydrogen gas produced is transported to a village, provided to a fuel cell to generate electricity, and supplied to fuel-cell vehicles, low-cost energy can be supplied to the inhabitants of the island.

The configuration, production method, action, and effect of the embodiment other than those described above are the same as the first embodiment described above.

Third Embodiment

Next, a third embodiment will be described.

The hydrogen production system according to the embodiment is a system that uses solar power as the renewable energy.

Figure 5:
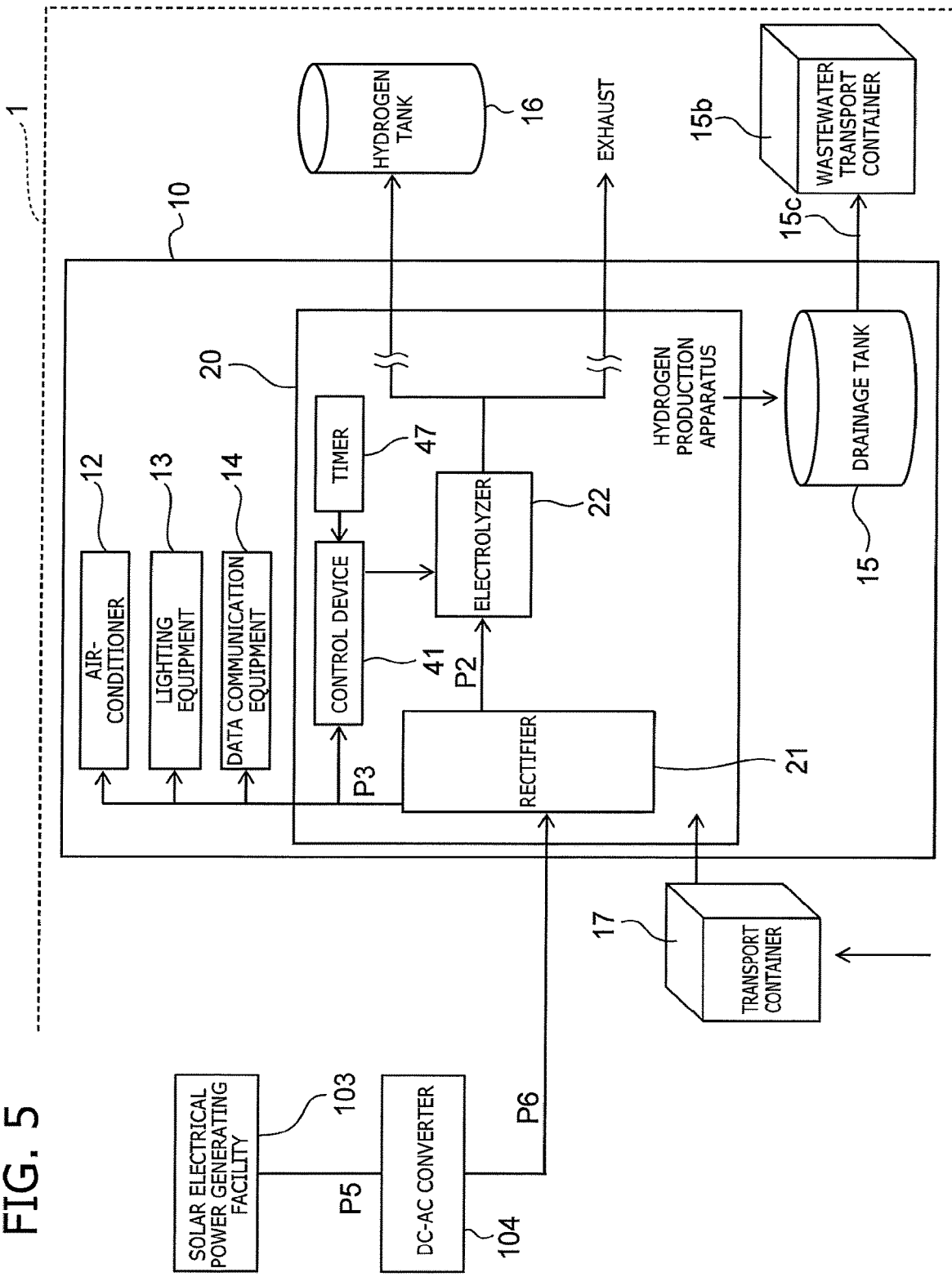
FIG. 5 is a block diagram illustrating a hydrogen production system according to a third embodiment.

FIG. 5 is a block diagram illustrating a hydrogen production system according to the embodiment.

As illustrated in FIG. 5, a hydrogen production system 3 according to the embodiment is provided with direct current electrical power P5 from a solar electrical power generating facility 103. The solar electrical power generating facility 103 is installed in a location where the sunlight is stable, for example, a desert or the like, and is provided with solar power generating panels. The direct current electrical power P5 is input into a DC-AC converter 104, and converted into alternating current electrical power P6. The alternating current electrical power P6 is input to the rectifier 21 of the hydrogen production system 3. Also, in the hydrogen production system 3, a timer 47 is provided connected to the control device 41.

In this way, the control device 41 stops the operation of the hydrogen production apparatus 20 before sunset, based on an output signal of the timer 47, and then purges each of the pipes with nitrogen gas, by the same operation as for a power stoppage described previously. After the purge is completed, the normally open valves 72v, 73v, 74v, and 75v are closed by being magnetized, so release of the nitrogen gas is stopped. Also, operation of the hydrogen production apparatus 20 is restarted after sunrise, and when production of the hydrogen gas is started, the normally open valve 68v is magnetized and closed, and the normally closed valve 67v is magnetized and opened, so the hydrogen gas produced is accumulated in the hydrogen tank 16.

Also, in the hydrogen production system 3, instead of the drainage tank 15 (see FIG. 1) that can be removed in the first embodiment (see FIG. 1) as described previously, a fixed type drainage tank 15a and a wastewater transport container 15b are provided. The fixed type drainage tank 15a is fixed within the building 10 or near the building 10, and is connected to a wastewater pipe 15c. The wastewater transport container 15b can be detachably connected to the wastewater pipe 15c, so that the wastewater from the fixed type drainage tank 15a can be injected into the wastewater transport container 15b, which is then disconnected from the wastewater pipe 15c, and transported by truck or the like to a location where the waste can be discharged. For example, the capacity of the fixed type drainage tank 15a is greater than the capacity of the wastewater transport container 15b.

According to the embodiment, the timer 47 is provided, and by operating the hydrogen production apparatus 20 in accordance with the sunlight hours, a stoppage due to sunset can be distinguished from a power stoppage due to a fault situation, and after sunrise, operation can be automatically restarted.

Also, by providing the fixed type drainage tank 15a and the wastewater transport container 15b, the capacity of each can be independently set. In this way, the capacity of the fixed type drainage tank 15a can be determined in accordance with the scale of production of hydrogen gas and the frequency of transport of wastewater, and the capacity of the wastewater transport container 15b can be determined in accordance with the size of the truck or the like used for transport. Also, the wastewater transport container 15b may be formed integrally with the truck.

The configuration, production method, action, and effect of the embodiment other than those described above are the same as the first embodiment or the second embodiment described above.

According to the embodiments as described above, it is possible to realize a hydrogen production apparatus and a hydrogen production system in which the pipes are not ruptured even when the supply of electrical power is stopped.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Additionally, the embodiments described above can be combined mutually.

What is claimed is:

1. A hydrogen production apparatus, comprising: a rectifier supplied with first electrical power from outside, and that outputs direct-current second electrical power; an electrolyzer supplied with the second electrical power and that carries out electrolysis of an alkaline aqueous solution; an electrolyte circulation tank that retains the alkaline aqueous solution; a pump that circulates the alkaline aqueous solution between the electrolyzer and the electrolyte circulation tank; a pure water tank that retains a pure water; a pure water pipe connected between the pure water tank and the electrolyte circulation tank, allowing the pure water to be distributed from the pure water tank to the electrolyte circulation tank; an inert gas cylinder that contains an inert gas; and a first valve connected between the inert gas cylinder and the pure water pipe, the first valve being closed when the first electrical power is supplied, and being open when the first electrical power is not supplied, wherein the inert gas is introduced into the pure water pipe by opening the first valve.

2. The apparatus according to claim 1, wherein the first valve is a normally open valve closed when magnetized and open when demagnetized.

3. The apparatus according to claim 1, further comprising:
a control device that switches the electrolyzer and the pump off when the first electrical power is not supplied, and
a storage battery that supplies the second electrical power to the control device.

4. The apparatus according to claim 3, wherein the control device opens the first valve when the supply of the first electrical power has stopped.

5. The apparatus according to claim 1, further comprising:
a hydrogen pipe that removes hydrogen gas from the electrolyzer; and
a second valve connected between the inert gas cylinder and the hydrogen pipe, the second valve being closed when the first electrical power is supplied, and being open when the first electrical power is not supplied, wherein
the inert gas is introduced into the hydrogen pipe by opening the second valve.

6. The apparatus according to claim 5, wherein the second valve is a normally open valve closed when magnetized and open when demagnetized.

7. The apparatus according to claim 5, further comprising;
a hydrogen leak detector; and
a control device that stops the electrolyzer and the pump, and opens the second valve when the hydrogen leak detector has detected a hydrogen leak.

8. The apparatus according to claim 5, further comprising;
an earthquake detector; and
a control device that stops the electrolyzer and the pump, and opens the second valve when the earthquake detector has detected an earthquake.

9. The apparatus according to claim 5, further comprising;
a fire detector; and
a control device that stops the electrolyzer and the pump, and opens the second valve when the fire detector has detected a fire.

10. The apparatus according to claim 1, wherein the first electrical power is generated by renewable energy.

11. The hydrogen production apparatus according to claim 1, wherein the first electrical power is an alternating-current power generated by water power.

12. A hydrogen production system, comprising:
a hydrogen production apparatus according to claim 1;
a building that houses the hydrogen production apparatus;
an air conditioner that adjusts the temperature within the building using a third electrical power supplied from the rectifier; and
a hydrogen tank that stores the hydrogen gas obtained from the electrolyzer.

13. The system according to claim 12, further comprising a transport container that transports pure water from outside to the pure water tank.

14. The system according to claim 13, wherein the transport container is formed from stainless steel.

* * * * *